United States Patent [19]
Schomburg

[11] Patent Number: 5,485,750
[45] Date of Patent: Jan. 23, 1996

[54] PROCESS FOR FINDING THE VALUE OF PARAMETERS CAPABLE OF CHANGING THE RESONANCE FREQUENCY OF MICROSTRUCTURES

[75] Inventor: Werner Schomburg, Karlsruhe, Germany

[73] Assignee: Kernforschungszenlrum Karlsruhe GmbH, Karlsruhe, Germany

[21] Appl. No.: 117,092

[22] PCT Filed: May 2, 1992

[86] PCT No.: PCT/DE92/00364

§ 371 Date: Sep. 8, 1993

§ 102(e) Date: Sep. 8, 1993

[87] PCT Pub. No.: WO92/19942

PCT Pub. Date: Nov. 12, 1992

[30] Foreign Application Priority Data

May 2, 1991 [DE] Germany ............. 41 14 268.3

[51] Int. Cl.$^6$ ................................. G01H 13/00
[52] U.S. Cl. ................. 73/579; 73/599; 73/630; 374/117
[58] Field of Search ............ 73/579, 599, 630, 73/646; 374/117

[56] References Cited

U.S. PATENT DOCUMENTS

| | | | |
|---|---|---|---|
| 3,355,933 | 12/1967 | Rowe | 73/579 |
| 4,297,872 | 11/1981 | Ikeda et al. | 73/579 |
| 4,297,884 | 11/1981 | Leverque et al. | 73/579 |
| 4,400,980 | 8/1983 | Lepert | 73/579 |
| 4,607,341 | 8/1986 | Monchalin | 73/599 |

*Primary Examiner*—Richard Chilcot
*Assistant Examiner*—Eric S. McCall
*Attorney, Agent, or Firm*—Klaus J. Bach

[57] ABSTRACT

In a process for finding the value of parameters which change the resonance frequencies of microstructures wherein the microstructures include at least one membrane mounted at its periphery and wherein at least one resonance frequency of the microstructures is between 100 kHz and 100 MHz, the frequency of the characteristic resonance frequency of the microstructures is detected by exposing the microstructures to ultrasound and measuring the intensity of the ultrasound transmitted through, or reflected from, the microstructure and the value of the parameter is then determined by means of a calibration curve.

11 Claims, 3 Drawing Sheets

PROCESS FOR FINDING THE VALUE OF PARAMETERS CAPABLE OF CHANGING THE RESONANCE FREQUENCY OF MICROSTRUCTURES

BACKGROUND OF THE INVENTION

The invention relates to a process for determining the value of parameters which change the resonance frequency of microstructures.

In J. Microwave Power (1987) pages 85 to 93 various processes for contact-free temperature measurements of objects whose temperature is to be determined but which are not directly accessible are described. In each case a glass fiber is brought close to the object whose temperature is to be measured. By measuring the temperature-dependent fluorescence properties of a fluorescent substance disposed on the object to be measured the temperature at the measuring location can be deducted. These processes however have the disadvantage that a glass fiber has to be brought into close proximity, that is, to no more than about 10 mm, to the object to be measured.

U.S. Pat. No. 3,596,069 discloses a similar process by which the resonance frequency of a cylindrical body is determined. Herefrom the frequency determining parameters are obtained. Further, from the German Patent Publication De 30 12 774 A1 it is known to excite a test body with ultrasonic radiation, whereupon the amplitude of the resonance frequency is measured. From the deviation of the resonance frequency amplitude from a predetermined value, the presence of a defect within the body is determined.

British Patent Publication GB 21 43 036A describes a method for the detection of intergranular defects of test pieces wherein ultrasound echoes of perfect pieces are registered as standard values. A comparison of the ultrasound echoes of faulty test pieces with the standard value gives an indication of the degree of faultiness. However, this procedure is not suitable for thin membranes because the travel distances of the sound within the membrane are too short.

Another method of this type is known from the U.S. book "Ultrasonic Testing" published by F. Szilard, 1982, pages 432–436.

Finally, in the Journal of the Acoustical Society of America, Vol. 80, No. 6, December 1986, pages 1762 to 1776, the resonance scattering of ultrasound in various layers is described.

It is the object of the present invention to provide a process which facilitates measurement of temperatures, expansion, pressures, densities, flow speeds, coating rates, internal mechanical strain and modules of elasticity of objects which are not directly accessible during measurement without the need for bringing circuit points or conductors in close proximity to the object to be measured during the measuring procedure.

SUMMARY OF THE INVENTION

In a process for finding the value of parameters which change the resonance frequencies of microstructures wherein the microstructures include at least one membrane mounted at its periphery and wherein at least one resonance frequency of the microstructures is between 100 kHz and 100 MHz, the frequency of the characteristic resonance frequency of the microstructures is detected by exposing the microstructures to ultrasound and measuring the intensity of the ultrasound transmitted through, or reflected from, the microstructure and the value of the parameter is then determined by means of a calibration curve.

BRIEF DESCRIPTION OF DRAWINGS

The invention will now be described in greater detail on the basis of FIGS. 1 to 6.

Wherein.

DESCRIPTION OF THE PREFERRED EMBODIMENTS

The first embodiment describes measurement of temperature with a structured titanium membrane which is freely stretched over a rigid frame.

In accordance with the method described in EP 0 104 685 honeycomb-shaped microstructures 1 were made on a titanium membrane 2 of 3 μm thickness freely stretched over a rigid frame 3. The rigid frame 3 was circular with an outer diameter of 40 mm and an inner diameter of 25 mm and consisted of a 6 mm thick iron-nickel alloy structure having a linear thermal expansion coefficient of about $5\times10^{-6}$. The honeycomb-shaped microstructures were made from nickel by way of the LIGA-process (E. W. Becker et al., Microcircuit Engineering 4 (1986) pages 35 to 56) and they had a height of about 28 μm with a web width of 10 μm and a honeycomb width of 80 μm.

Figure 1:
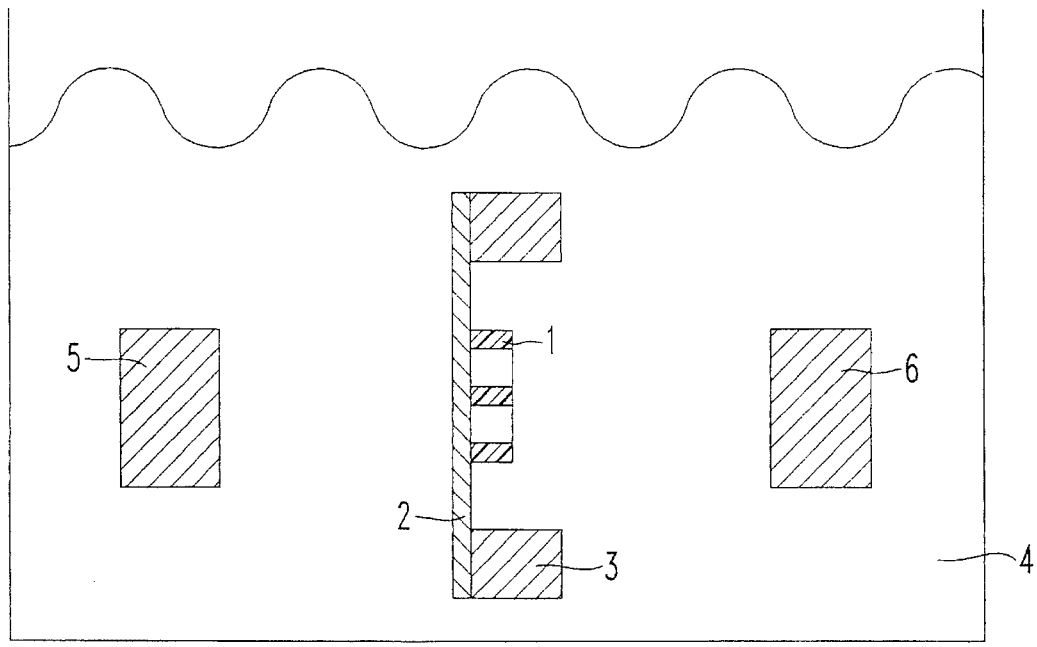
FIG. 1 shows schematically an arrangement for determining the frequency and FIG. 2 shows the absorption of ultrasound depending on the frequency.
Figure 2:
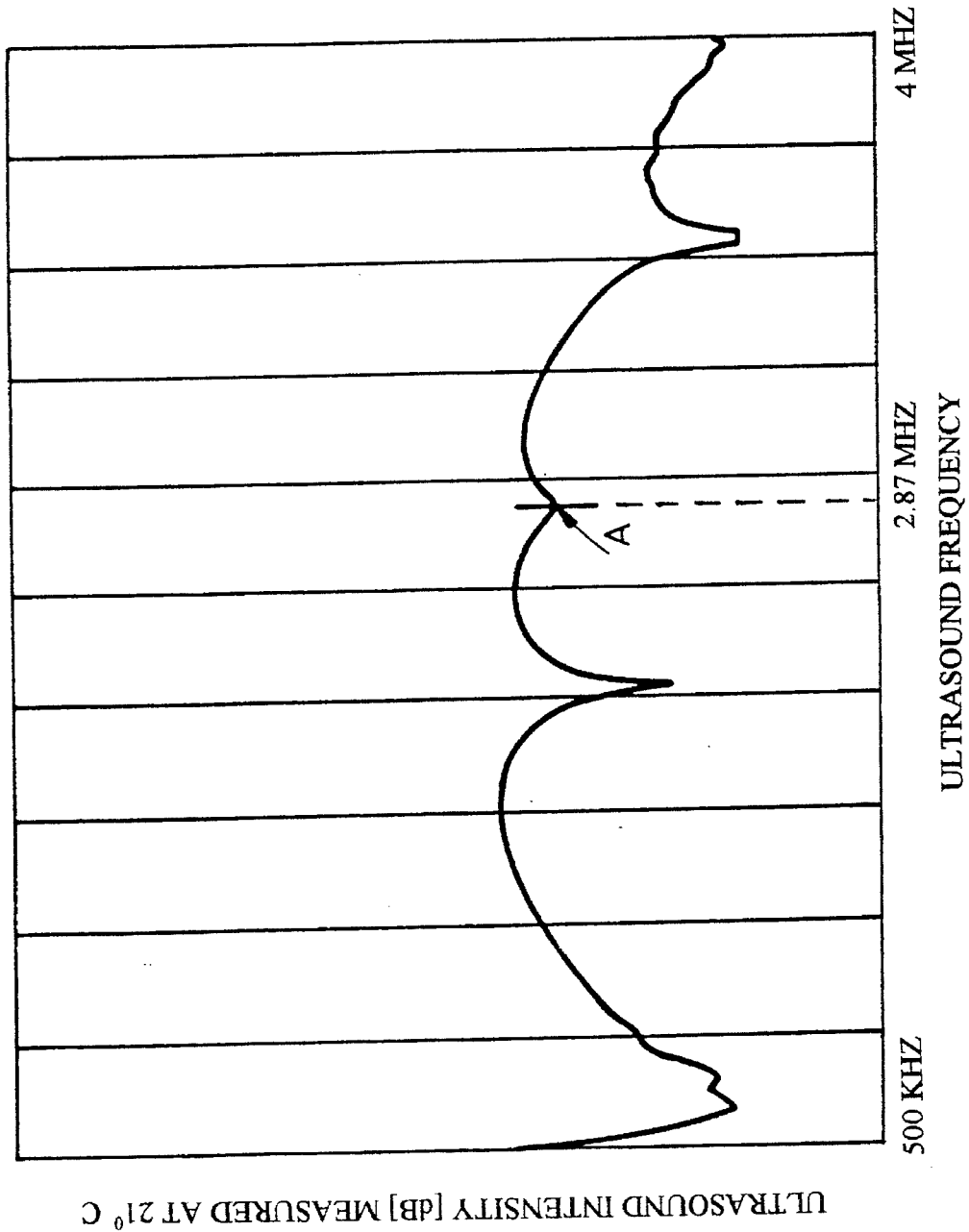

The so structured membrane was placed in a water bath 4 with a temperature of 21° C. and exposed, by an ultrasound generator 5 to ultrasound in the frequency range of 500 kHz to 4 MHz (see FIG. 1). An ultrasound receiver 6 arranged behind the membrane recorded the intensity of the ultrasound penetrating the membrane dependent on the ultrasound frequency. The diameter of the ultrasound generator and of the receiver was about 12 mm; their relative distance was 30 mm. It was found that as a result of the vibration resonance of the structured membrane absorption of the ultrasound was increased at a frequency of 2.87 MHz. This increased absorption is shown in FIG. 2 at the location indicated with A. FIG. 2 shows the intensity of the ultrasound over the ultrasound frequency as registered by the ultrasound receiver 6. The frequency range covered on the base is from 500 kHz to 4 MHz. During measurements with a membrane 2 made in the same way but without microstructures 1 and during measurements without any membrane between the ultrasound generator 5 and receiver 6, no increased absorption was found at the location designated with A within the same intensity spectrum. The ultrasound intensity was reduced in the resonance range by about 9 dB when compared with the transmission through an unstructured membrane.

By heating the water bath to 45° C. the resonance frequency was changed to 2.77 MHz. The change of the resonance frequency was caused by the thermal expansion coefficient of about $9\times10^{-6}$ of the titanium membrane being larger than that of the frame, which provided for reduced inner tension of the titanium membrane at higher bath temperatures.

A reduced inner tension of the membrane closing the microstructures leads to a lower resonance frequency. By determining the characteristic frequency at various known temperatures, a calibration curve can be made.

The second embodiment explains the expansion measurement by means of a microstructured membrane.

Figure 3:
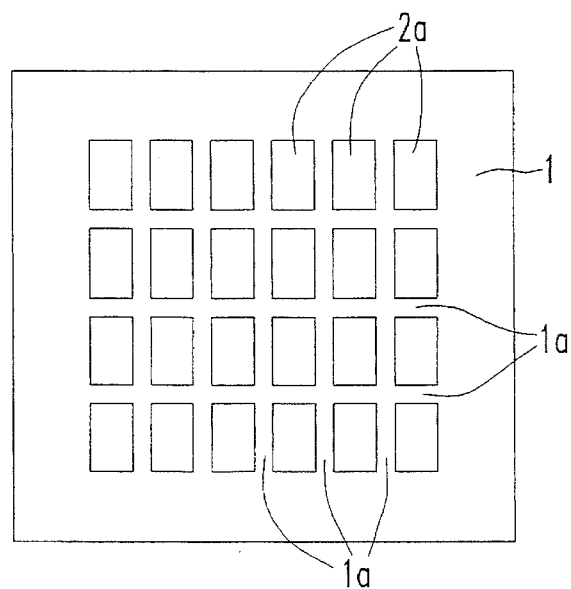
FIGS. 3 to 6 show examplary embodiments of microstructures.

In accordance with the method described in EP 0 104 685 a microstructure 1 as shown in FIG. 3 may be provided on a membrane freely stretched over a frame. The microstructure consists of an arrangement of webs which leave the membrane unobstructed in rectangular areas 2a. The rectangular areas 2a are all oriented in the same way. With the method presented on page 408 of the 9. edition of the book "Theoretische Mechanik" by A. Budo, published by VEB Deutscher Verlag der Wissenschaften, Berlin 1978, a two-dimensional wave equation can be calculated from which the resonance frequencies of the parts 2a of the membrane which are freely movable between the webs can be determined. As a result $$v_{mn} = \frac{1}{2} \sqrt{\frac{\sigma_a m^2}{a^2} + \frac{\sigma_b n^2}{b^2}} \sqrt{\frac{1}{\rho_M}} \quad (1)$$

Herein $v_{mn}$ designates the resonance frequency with m antinodes of oscillation in the direction of an edge of the rectangular areas with the length a and with n antinodes of oscillation along the edge with the length b. $\sigma_a$ and respectively $\sigma_b$ designate the inner mechanical tension of the membrane in the direction of the edges of the lengths a and b, respectively. $\rho_M$ represents the density of the membrane.

Changes of the inner tension along the two edge lengths can therefore be calculated from the changes of the resonance frequencies $v_{11}$, $v_{12}$ and $v_{21}$. With the rectangular microstructure expansions in two different directions can therefore be determined and distinguished from one another. However, evaluation of the ultrasound spectra is facilitated if one of the edges of the rectangle is substantially longer than the other. According to equation (1) only the change in tension along the shorter edge has a large influence on the basic frequency $v_{11}$. For a << it holds:

$$v_{11} = \frac{1}{2a} \sqrt{\frac{\sigma_a}{M}} \quad (2)$$

If the tensions in two different directions are to be measured, rectangles of different lengths $a_1$ and $a_2$ of the short edges may be arranged on the membrane in different orientations. It is advantageous with this arrangement that only the basic frequencies have to be measured in each case and that two directions in which the membrane tension is to be determined do not need to be normal with respect to one another. In addition the number of measurement directions may be increased by providing additional rectangular structures.

When measuring a wide-band ultrasound spectrum reflected from the membrane the resonance frequencies become visible. An expansion of the frame supporting the membrane causes stretching of the membrane so that the inner mechanical tension of the membrane in the direction of frame expansion is changed. With the inner tension of the membrane the resonance frequencies are also changed so that from the changes of the two resonance frequencies the amount and direction of the frame expansion can be determined.

It is advantageous for this expansion measurement if the frame 3 and the membrane 2 consist of the same material so that temperature changes will not cause any changes in the stretch state. The microstructure 1 should also consist of the same material as the frame and the membrane or the webs 1a of the microstructure should be so low and narrow that their thermal expansion has no influence on the measurements. Nickel webs of 10 μm width and 30 μm height on a 3 μm thin membrane have been found to be sufficiently low and narrow so as not to disturb the measurement as a result of thermal expansion and temperature variations of ±20° C.

Figure 4:
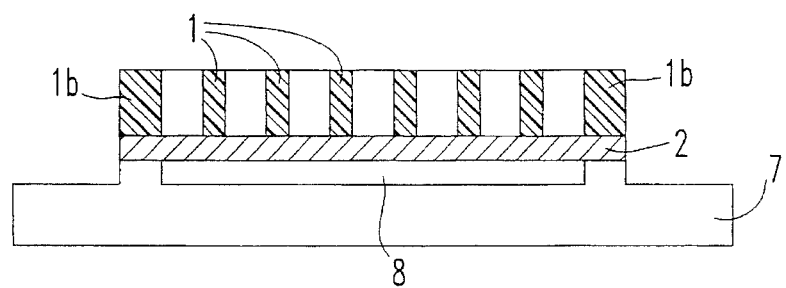

If the microstructure 1 according to FIG. 4 is disposed in a closed frame 1b it can be separated from the membrane and, mounted on a test body 7, used as an expansion measurement strip. In this case it is necessary that for the medium surrounding the microstructures there is an opening to the volume 8 between the membrane and the substrate. Such an opening prevents formation of a differential pressure over the membrane which would increase the tension in the membrane and consequently simulate, during measurement of the resonance frequencies, an expansion of the test body 7.

The third embodiment describes the contact-free measurement of pressure.

Figure 5:
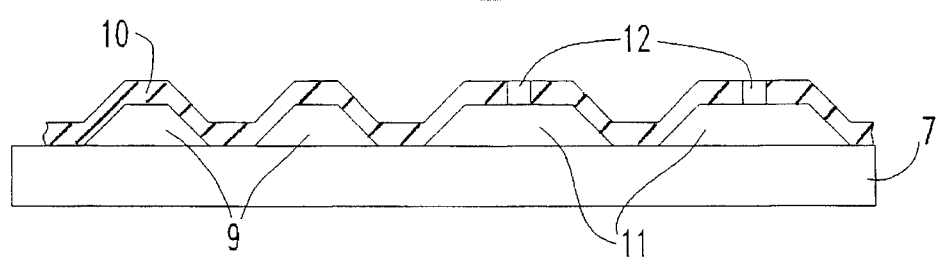

For measuring pressure with the method described herein, for example, microstructures are suitable which, mounted on a substrate 7, form cavities 9 as shown in FIG. 5. Such structures can be made, for example, by a process as described by R. T. Howe in J. Vac. Technol. B6 (1988) pages 1809 to 1813. In this process a cover layer 10 is applied over a sacrifice layer. After dissolution of the sacrifice layer the cavity 9 is closed. In this way essentially cylindrical cavities can be made which are closed on top by a membrane. A pressure difference between the cavities and the surrounding medium leads to an increase in the mechanical tension in the membrane and consequently in a change in the resonance frequency.

In order to make it possible to recognize changes of tension caused by different thermal expansion of the substrate 7 and cover layer 10 or by an expansion of the substrate and take it into consideration during measurement of the pressure it is of great advantage if in addition to the closed cavities 9 there are provided also cavities 11 which, because of different geometrical dimensions, have different resonance frequencies and which are in communication with the surrounding medium via openings 12. With the resonance frequency generated by the cavities 11, a correction value can be calculated which permits more accurate pressure determination.

The fourth embodiment describes the measurement of the density of the medium surrounding the structures.

The lowest resonance frequency $v_K$ of a circular membrane with the radius r, the inner tension $\sigma$, the thickness d and the density $\rho_M$ can be calculated, for example, by means of the equations given by R. E. Acosta et al. in Solid State Technology (October 1984) page 206, if the density of the surrounding medium is designated with $\rho_n$, by:

$$v_K = \frac{1}{2.61\, r} \sqrt{\frac{\sigma}{\rho_M + 1.34\, \rho_n\, r/d}} \quad (3)$$

Figure 6:
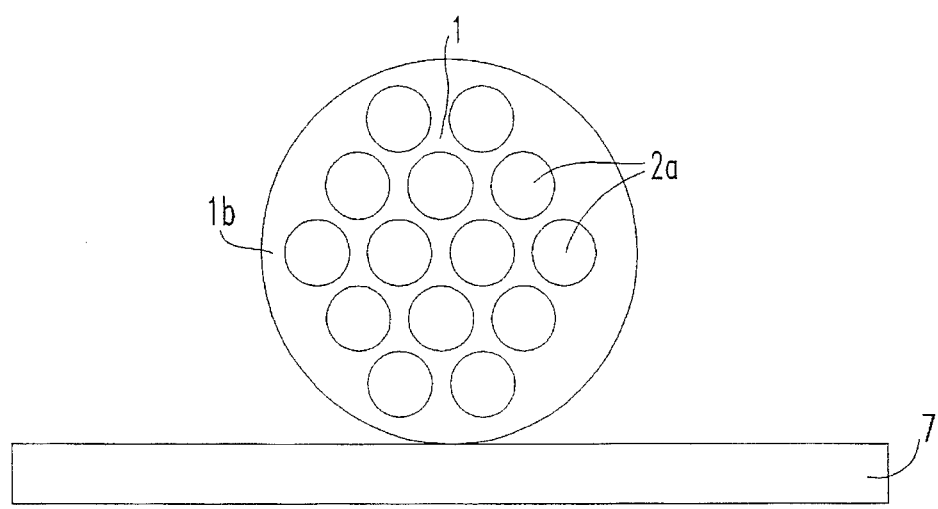

As equation (3) shows, the resonance frequency of a membrane freely stretched over a circular microstructure depends on the density of the medium surrounding the membrane. It is therefore possible to determine the density of the surrounding medium by measuring the resonance frequency of such a membrane. For measuring the density of the medium surrounding the membrane it is advantageous if the microstructures 1, which maintain circular areas 2a of the membrane freely tensioned, are held together by means of a frame 1b and are separated from the membrane after manufacture thereof in accordance with the method described in EP 0 104 685. As shown in FIG. 6 the frame is then mounted on a substrate if the sensor is to be firmly located. By such mounting of the sensor the application of external forces to the microstructures or the membrane is prevented. It is herein also advantageous if the microstructures are shielded from possible currents. In order to prevent temperature changes from simulating density changes of the medium it is advantageous if the microstructures and the membrane consist of the same material.

With the sensor shown in FIG. 6 it is, for example, possible to measure the charge condition of a battery or the density of a galvanic electrolyte. By arranging two sensors whose resonance frequency is different because of different geometric dimensions of the microstructures and of whom one is shielded from while the other is exposed to currents, the measurement of current velocities is possible since a differential pressure is generated across the membrane if a medium flows normal to the membrane cross-section.

The sensors shown in FIG. 6 is also suitable for measuring deposit rates in a galvanic electrolyte if the microstructures and the membrane consist of an electrically non-conductive material and if the membrane is coated with a galvanic starter layer on its side opposite the microstructures. Upon material deposition on the membrane, the medium density of the membrane material as well as the membrane thickness in equation (3) are changing which results in a change of the resonance frequency. In order to avoid an influence of the inner mechanical tension of the deposited layer on the measurement of the thickness of the deposited layer a calibration is necessary under the same conditions under which the measurement is to be performed. But it is also possible to measure the inner tension of a layer just deposited, if the deposit rate is determined—at a known current efficiency—by measuring the deposit current. Deposit layer thickness and inner mechanical tension of the deposit layer can be determined if two of the structures shown in FIG. 6 are employed whose resonance frequencies are different from one another because of different membrane thicknesses or different radii of the circular freely stretched areas of 2a of the membrane.

In the fifth embodiment it is described how material changes on thin radiation windows can be monitored by microstructures disposed on such windows wherein one or more partial areas are formed so as to become vibratory structures whose resonance frequency depends on the inner tension of the radiation windows.

Vacuum windows of particle accelerators or in front of detectors often consist of membranes of synthetic resin or of metals which have a thickness of only a few μm. Such vacuum windows may change during extended use by chemical reactions with the environment or by interaction with ionizing radiation in such a way that fracture of the vacuum window may occur. Such changes of the vacuum windows may be coincident with changes in the inner tension of the windows which are caused by a changing elasticity module or a changed expansion of the window. The frequencies of the resonance vibrations which become possible if the window membrane is provided with microstructures of the type shown in FIG. 6 are, in accordance with equation (3), dependent on the inner tension σ of the window membrane. By measuring the resonance frequencies a change of the material properties of the window membrane can therefore be detected. Damage to sensitive apparatus by unexpected fracture of a vacuum window can therefore be prevented by timely exchange of the window.

A further advantage of the method resides in the good localization capability of the measurements which is achieved because of the small dimensions of the single structures.

Temperature measurements are practically free of any delay because of the small heat capacity of the microstructures.

What is claimed:

1. A process for finding with a microstructure having a varying resonance frequency depending on a value of a parameter which changes the resonance frequency of said microstructure, wherein said microstructure includes at least one membrane having a periphery by which it is mounted on said microstructure and wherein at least one resonance frequency of the microstructure is between 100 kHz and 100 MHz, by a) detecting the value of a characteristic resonance frequency of said microstructure wherein said microstructure is exposed to ultrasound which is transmitted through, or reflected from, said microstructure with a particular intensity and the intensity of the ultrasound transmitted through, or reflected from, said microstructure is determined, and b) determining the value of said parameter by means of a calibration curve.

2. A process according to claim 1, wherein said microstructure is disposed in an environment and said microstructure and said environment have a certain temperature and said parameter to be measured is the temperature of the microstructure, that is its environment, said microstructure consisting of a support frame and a membrane with different thermal expansion coefficients, said membrane being stretched freely over said support frame.

3. A process according to claim 1, wherein said parameter to be measured is a change of length of a substrate, said microstructure being firmly mounted on the substrate.

4. A process according to claim 1, wherein said parameter to be measured is a surrounding pressure, said membrane and a support structure defining an outwardly closed capsule.

5. A process according to claim 1, wherein said parameter to be measured is a pressure differential across said membrane.

6. A process according to claim 1, wherein said microstructure is surrounded by a medium having a given density and said parameter to be measured is the density of the surrounding medium.

7. A process according to claim 1, wherein said microstructure is disposed in a flowing medium and said parameter to be measured is the flow velocity of the surrounding medium.

8. A process according to claim 1, wherein a material is deposited on said membrane and said parameter to be measured is the material deposition on the membrane.

9. A process according to claim 1, wherein said membrane has a given modulus of elasticity and said parameter to be measured is the elasticity module of the membrane.

10. A process according to claim 1, wherein said membrane has an inner mechanical tension and said parameter to be measured is the inner mechanical tension of the membrane.

11. A process according to claim 1 wherein several microstructures are disposed on a common carrier for determining at least one of said parameters.

\* \* \* \* \*